(12) United States Patent
Yamada et al.

(10) Patent No.: US 11,356,570 B2
(45) Date of Patent: Jun. 7, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Takayuki Yamada, Kawasaki (JP); Jumpei Takeichi, Tokyo (JP); Hiroyasu Kunieda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/196,216

(22) Filed: Mar. 9, 2021

(65) Prior Publication Data
US 2021/0289082 A1 Sep. 16, 2021

(30) Foreign Application Priority Data
Mar. 16, 2020 (JP) .............................. JP2020-045638

(51) Int. Cl.
*H04N 1/00* (2006.01)
*G06T 11/60* (2006.01)

(52) U.S. Cl.
CPC ......... *H04N 1/00196* (2013.01); *G06T 11/60* (2013.01)

(58) Field of Classification Search
None
See application file for complete search history.

(56) References Cited

U.S. PATENT DOCUMENTS

| 2009/0089312 A1* | 4/2009 | Chi ..................... G06F 16/9038 |
| 2018/0146105 A1* | 5/2018 | Saito .................. H04N 1/00196 |
| 2020/0012877 A1 | 1/2020 | Kotake et al. |
| 2021/0203791 A1* | 7/2021 | Noguchi ............ H04N 1/00196 |

FOREIGN PATENT DOCUMENTS

JP 2019-215593 A 12/2019

* cited by examiner

*Primary Examiner* — Lennin R Rodriguezgonzalez
(74) *Attorney, Agent, or Firm* — Carter, DeLuca & Farrell LLP

(57) ABSTRACT

An album creating app obtains model templates forming a model album, candidate images to be used to create an album, and a candidate template usable as an alternative template to the model templates. For each model image included in each model template, the app selects a similar image being one of the candidate images which is more similar to the model image than the other candidate images. Then, in a case where a similarity between the model image in the model template for a processing target and the selected similar image is smaller than a predetermined threshold, the app determines which of the model template for the processing target and the candidate template is to be used as a template for processing of the processing target. Then, the app creates a layout by placing, on the template determined, an image similar to an image placed on the template determined.

20 Claims, 11 Drawing Sheets

FIG.3A

| NO. OF PAGES | SIZE (W) | SIZE (H) | PAPER TYPE | BINDING PORTION |
|---|---|---|---|---|
| 20 | 150 | 150 | GLOSS PAPER | PERFECT BINDING |

FIG.3B

| SPREAD NO. | x | y | w | h | angle | image path |
|---|---|---|---|---|---|---|
| 0 | 150 | 0 | 150 | 150 | 0 | image1.jpg |
| 1 | 10 | 10 | 130 | 130 | 0 | image12.jpg |
| 1 | 160 | 10 | 130 | 130 | 0 | image15.jpg |
| 2 | 10 | 80 | 130 | 60 | 0 | image19.jpg |
| 2 | 10 | 10 | 130 | 60 | 0 | image20.jpg |
| 2 | 175 | 10 | 100 | 130 | 0 | image22.jpg |
| ... | ... | ... | ... | ... | ... | ... |
| 10 | 0 | 0 | 300 | 150 | 0 | image103.jpg |
| 10 | 20 | 60 | 60 | 80 | 10 | image5.jpg |

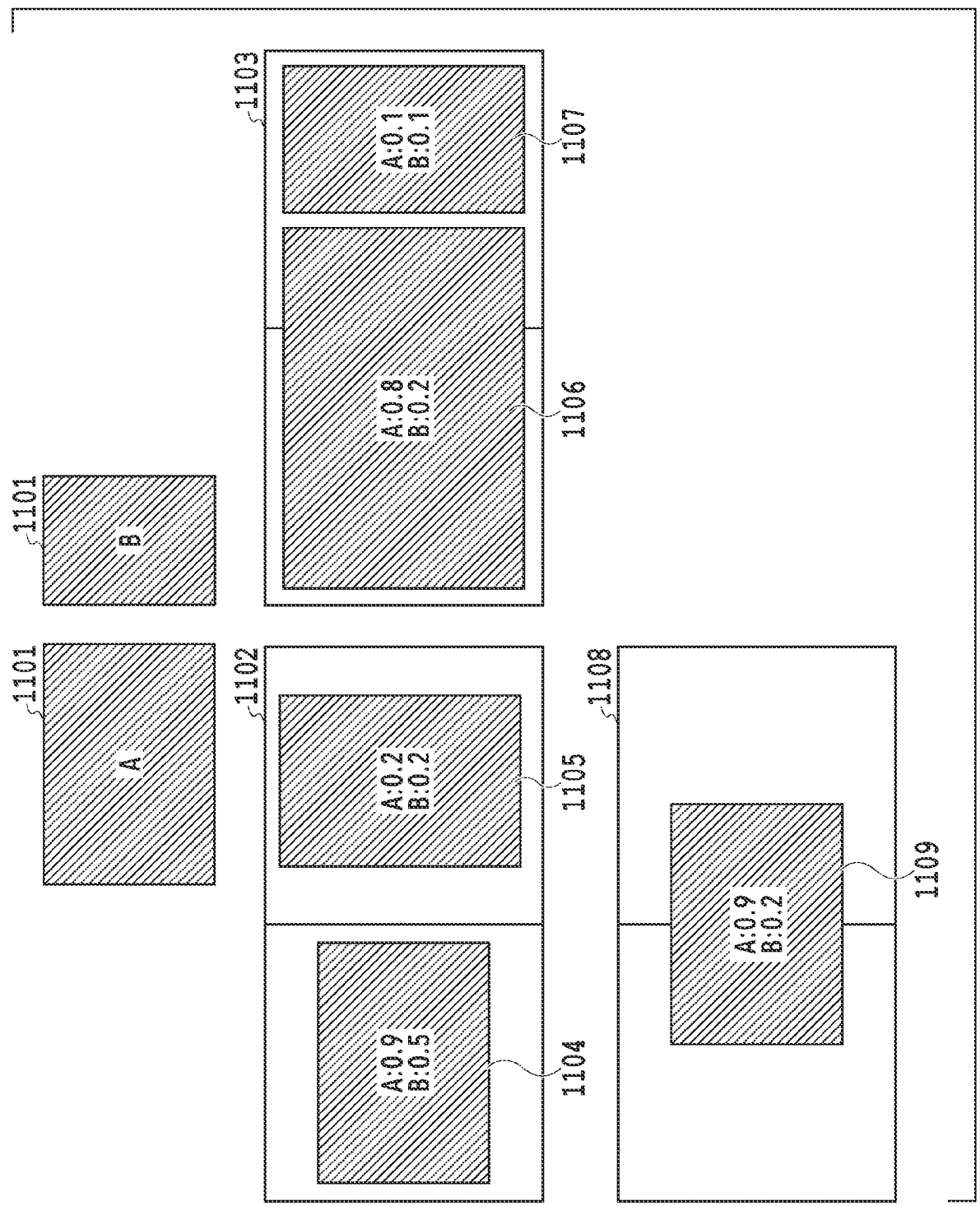

IMAGE PROCESSING APPARATUS, IMAGE PROCESSING METHOD, AND STORAGE MEDIUM

BACKGROUND

Field

The present disclosure relates to an image processing apparatus, an image processing method, and a storage medium.

Description of the Related Art

Japanese Patent Laid-Open No. 2019-215593 describes a technique for creating an album using information on a group of images inputted.

In recent years, there have been demands for techniques for easily generating a printed article desired by a user.

SUMMARY

An image processing method comprises: obtaining a plurality of model templates forming a model album, a group of candidate images to be used to create an album, and a candidate template usable as an alternative template to the model templates; for each model image included in each of the model templates, selecting a similar image being one of the group of candidate images which is more similar to the model image than the other candidate images; in a case where a similarity between the model image in the model template for a processing target and the similar image thus selected as an image similar to the model image is smaller than a predetermined threshold, determining which of the model template for the processing target and the candidate template is to be used as a template for processing of the processing target; and creating a layout by placing, on the template thus determined, an image similar to an image placed on the template thus determined.

Further features of the present disclosure will become apparent from the following description of exemplary embodiments with reference to the attached drawings.

BRIEF DESCRIPTION OF THE DRAWINGS

FIGS. 3A and 3B are diagrams showing the structure of album data:

FIG. 11 is a diagram illustrating a method of template selecting processing.

DESCRIPTION OF THE EMBODIMENTS

Preferred embodiments of the present disclosure will be described in detail below with reference to the attached drawings. It should be noted that the following embodiments are not intended to limit the present disclosure defined by the scope of claims, and not all the combinations of features described in the embodiments herein are necessarily essential to the solving means of the present disclosure.

First Embodiment

In the present embodiment, an image processing apparatus runs an album creating application (also called an "application" or simply an "app" hereinbelow), and generates, on the application, album data in which a plurality of picture images are automatically laid out. Then, this album data is printed to create a plurality of albums as printed articles. Based on album data to serve as an example (called model album data), the present embodiment creates similar album data which is similar to the model album data using a group of images different from a group of images used in the layouts in the example album data. More specifically, the present embodiment creates similar album data which has the same number of pages as the model album data and in which similar images similar to model images arranged on the pages of the model album data are arranged at the same positions as the model images. This can simplify users' troublesome work such as selecting images from a large number of images taken, determining layouts, and determining templates. In the present embodiment, an album created based on model album data is called a model album, and an album created based on similar album data is called a similar album.

A wedding album is a specific example of an album created based on similar album data similar to model album data. Albums with fixed formats, such as wedding albums, are created by arranging images taken throughout a ceremony with a fixed style, such as exchanging wedding rings, cutting the cake, and making speeches, in the same order as they happened. For such creation of an album, an album to serve as an example is prepared, and images similar to model images in the model album are selected and arranged. Thus, an album with beautiful layouts can be created efficiently.

There are cases where a group of images used for creating a similar album do not include a similar image similar to a model image. In such a case, it may be difficult to create a similar album automatically because a similar image to be placed at the position of the model image cannot be selected from the group of candidate images. The following embodiment describes an example of processing to automatically create a similar album similar to a model album even in a case where a group of candidate images do not include a similar image similar to a model image.

<Hardware Configuration of the Image Processing Apparatus>

Figure 1:
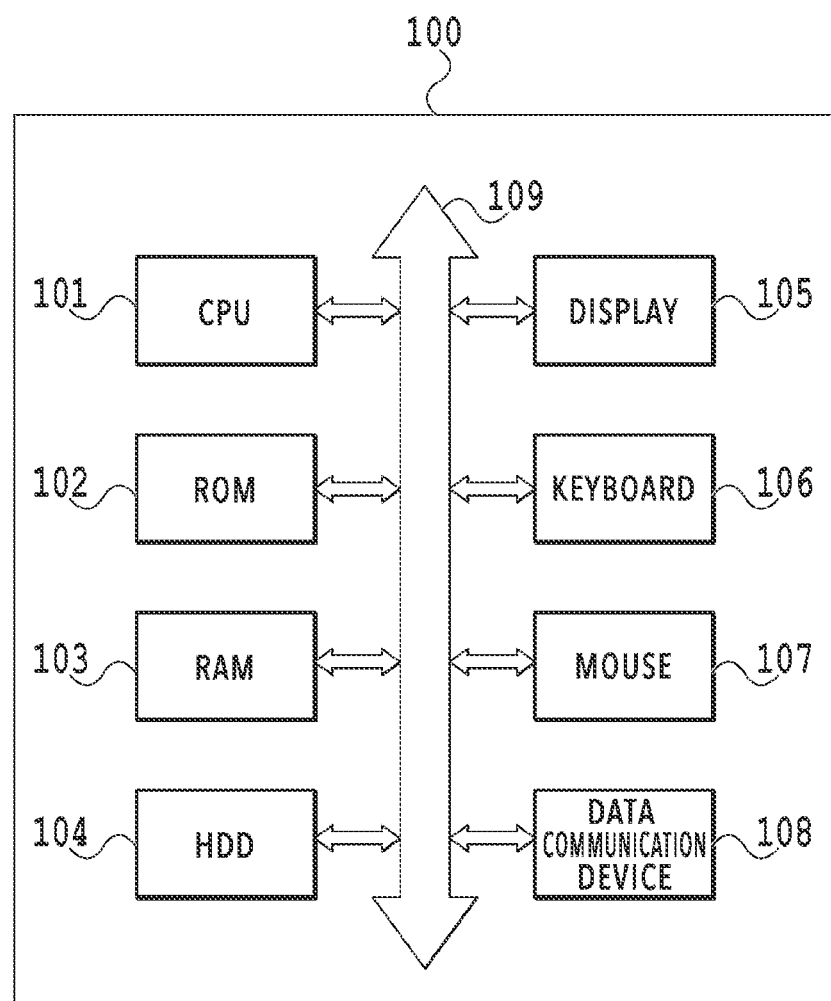
FIG. 1 is a block diagram showing the hardware configuration of an image processing apparatus.

FIG. 1 is a diagram showing the hardware configuration of an image processing apparatus of the present embodiment. Although the following describes an example where the image processing apparatus is an information processing apparatus (PC), other apparatuses, such as a smartphone, may be employed as the image processing apparatus.

As shown in FIG. 1, an image processing apparatus 100 has a CPU 101, a ROM 102, a RAM 103, an HDD 104, a display 105, a keyboard 106, a mouse 107, and a data communication device 108. They are connected via a data bus 109, so that data can be transmitted and received between them.

The CPU 101 performs overall control of the image processing apparatus 100. The CPU 101 executes an image processing method described in the present embodiment according to programs. Although the image processing apparatus has only one CPU in FIG. 1, the image processing apparatus may have more than one CPU.

The ROM 102 stores programs to be executed by the CPU 101. The RAM 103 provides memory where the CPU 101 temporarily stores various kinds of information during execution of the programs. The HDD 104 stores image files, databases for retaining results of processing such as image analysis, and the like. In the present embodiment, the HDD 104 is where an album creating application program is stored. This application program may also be called an album creating app. A description will be given later about the album creating app using FIG. 2 and other drawings.

The display 105 is a display device for displaying and presenting to a user a user interface (UI) and resulting layouts of images of the present embodiment. The display 105 may have a touch sensor feature. The keyboard 106 is one of the input devices that the image processing apparatus 100 has, and is used to, for example, input predetermined information on a graphical user interface (GUI) displayed on the display 105. In the present embodiment, a user inputs album creating conditions through the keyboard 106. The mouse 107 is one of the input devices that the image processing apparatus 100 has, and is used to, for example, click on and press a button on the GUI displayed on the display 105. The display 105 may be a device external to the image processing apparatus 100.

The data communication device 108 is a device for communicating with external devices such as a printer or a server. For example, through the data communication device 108, album data having images automatically laid out is transmitted to the printer or the server connected to the image processing apparatus 100. The data bus 109 connects the above-described constituents and the CPU 101 together. This is the hardware configuration of the image processing apparatus of the present embodiment. In the present embodiment, similar album data created based on model album data is used as album data having images automatically laid out.

<Software Configuration of the Image Processing Apparatus>

Figure 2:
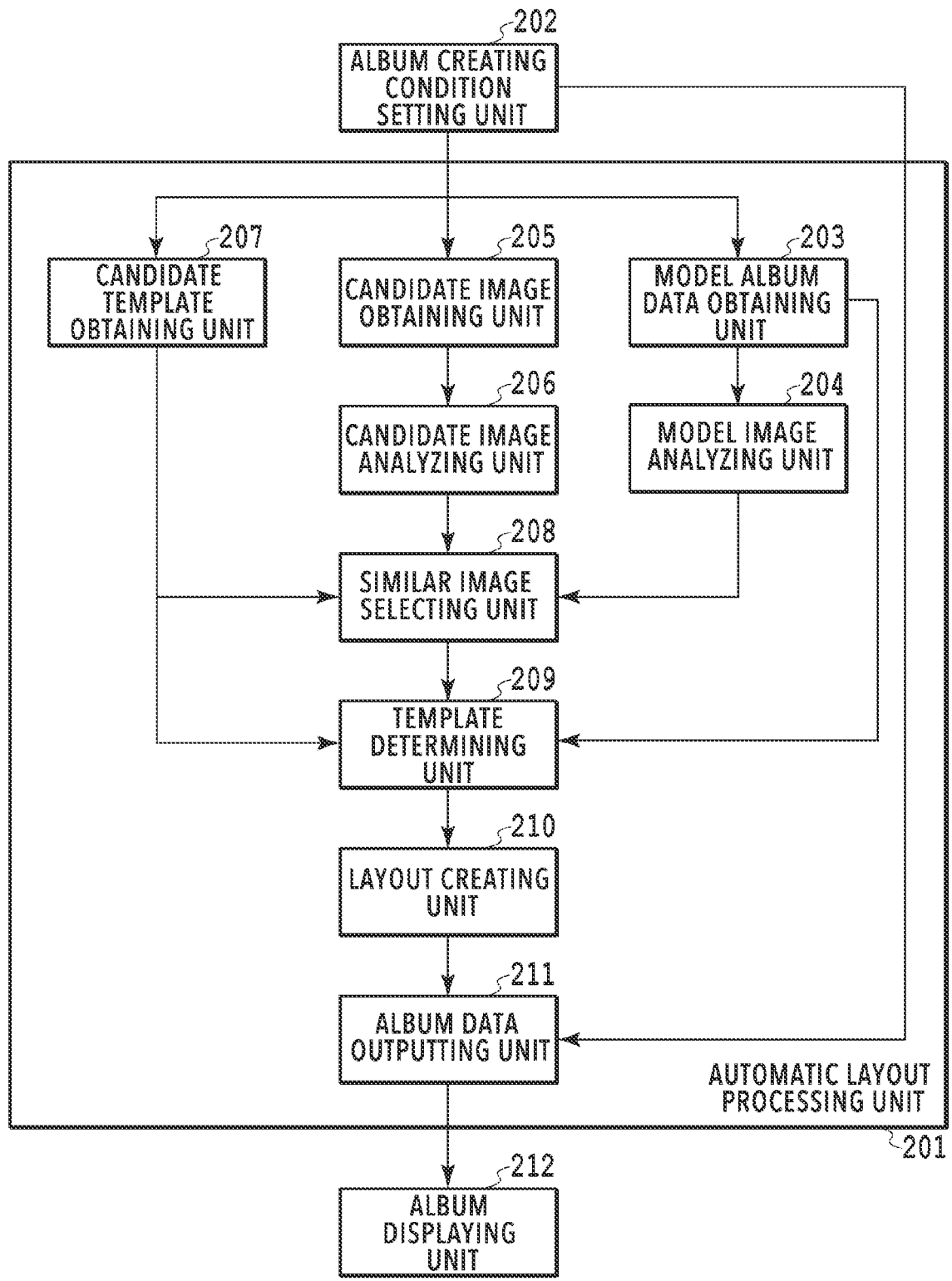
FIG. 2 is a block diagram showing the software configuration of the image processing apparatus.

FIG. 2 is a diagram showing the software configuration of the image processing apparatus of the present embodiment, or in other words, the functions implemented by the album creating application installed in the image processing apparatus. The album creating application is activated by a user's double-clicking on an icon of the application displayed on the display 105 using the mouse 107. Although the album creating application has various functions, the following mainly describes an automatic layout function provided by an automatic layout processing unit 201.

As shown in FIG. 2, this app has an album creating condition setting unit 202, the automatic layout processing unit 201, and an album displaying unit 212. An "automatic layout function" is a function to create album data by classifying a plurality of images included in a group of images used by the automatic layout function based on the contents and attributes of the images, selecting images to use for each layout from the group of images, and laying out the selected images. Album data thus created is displayed on the display 105. The classification of image data is not essential.

The album creating condition setting unit 202 displays a GUI to be described later, and sets album creating conditions specified by a user through the GUI, for the automatic layout processing unit 201. In the present embodiment, model album data, a group of images to use for an album, and an album product are set as the album creating conditions. The model album data may be set based on the structure of a file system in which the model album data is stored, such as, for example, specifying a file or a directory, or may be selected by a user from preset options registered in the app beforehand. The group of images used to create similar album data may be set using, for example, information accompanying each individual set of image data, such as shooting date and time, and attribute information. Alternatively, the album creating conditions may be set based on the structure of a file system in which the image data is stored by a user specifying a device or a directory. As the album product, information on the type of paper used for the album and the binding style of the album are set.

Here, a description about an album created in the present embodiment is given. In the present embodiment, an album is formed by cover pages and a plurality of spreads. For example, in digital representation, a "spread" corresponds to a single window of display, and in printed form, a "spread" corresponds to a pair of adjacent pages printed on different sheets. Images may be printed on a single sheet and folded in half to create an album. In such a case, a "spread" corresponds to a pair of adjacent pages printed on the same sheet. Although the following description uses such concept of spreads, the concept of pages may be used instead. In other words, although the layout creating processing to be described later handles one spread as one processing target, one page may be handled as one processing target instead. In the present embodiment, similar album data similar to model album data is created based on the model album data and a group of candidate images set by the album creating condition setting unit 202.

Album data herein refers to data including image data on images placed in an album and information such as the number of a spread in which each image is placed, the position of the image, and the size of the image.

FIGS. 3A and 3B show an example of album data used in the present embodiment. FIG. 3A shows an example of a product table (product information) indicating overall information on an album. Items recorded in the product table include the number of pages in the album, the size of the album, the type of print paper, and the binding style.

FIG. 3B shows an example of a slot table showing images placed on the paper and the positions of the images. Items recorded in the columns of the slot table include an image placed in the album, the spread number, the position of the image, the size of the image, and the angle of the image. Hereinbelow, information presented in a single row of the table in FIG. 3B is called slot information. It should be noted that information included in album data is not limited to the above. Slot information may include information such as layer information indicating the order in which overlapping images are displayed, the trimming amount, the effect type, text information, and graphic information. Examples of the effect type include gradation, monochrome, and sepia. Slot information may also include information on frame embellishments.

Figure 4:
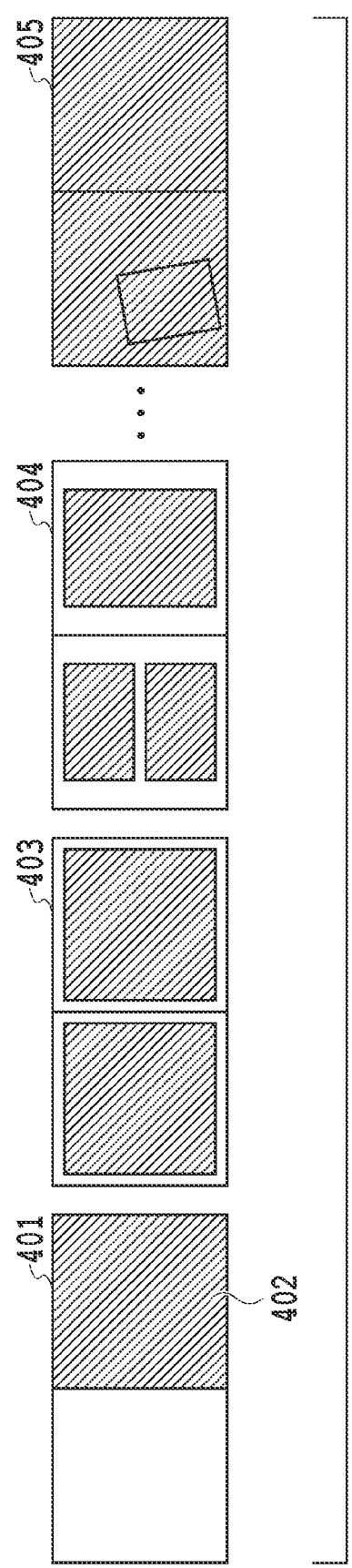
FIG. 4 is a diagram showing album layouts.

FIG. 4 is example layouts of the album data in FIGS. 3A and 3B. Cover pages 401, a spread 403, a spread 404, and a spread 405 laid out in FIG. 4 correspond to the spread numbers 0, 1, 2, and 10 in FIG. 3B, respectively. The left and right pages of the cover pages 401 correspond to the back cover and the front cover, respectively. The hatched areas in FIG. 4 are slots where the image data recorded in the column "image path" in FIG. 3B are placed. For example, "image1.jpg" is placed in a slot 402. The automatic layout processing to be described later creates similar album data in which images having image characteristics, such as compositions, objects, and tones, similar to the images arranged in the model album data are arranged at the same positions as those in the model album data.

Referring back to FIG. 2, the description of the app is continued. From album data stored in the HDD 104, a model album data obtaining unit 203 obtains model album data set by the album creating condition setting unit 202.

A model image analyzing unit 204 analyzes each of model images in the model album data obtained by the model album data obtaining unit 203. In the present embodiment, the model image analyzing unit 204 derives a feature value of each model image, determines an object in the model image, determines the composition of the image, detects a face, recognizes an expression on the face detected, and executes personal recognition of the face detected. The model image analyzing unit 204 also refers to data accompanying the image data obtained from the HDD 104 (e.g., Exif information) and obtains information on the shooting date and time. Information obtained by the model image analyzing unit 204 as a result of the analysis of image data is called "analysis information" on the image data.

From the images stored in the HDD 104, a candidate image obtaining unit 205 obtains a group of images set by the album creating condition setting unit 202 as input images. The group of images here refers to a group of candidate images (a candidate image group) which are candidates to be laid out in creating a similar album. In the present embodiment, similar images to be used for similar album data are selected from a group of candidate images. The images stored in the HDD 104 include still images and images extracted from videos. The still images and extracted images are obtained from an image capturing device such as a digital camera or a smart device. The image capturing device may be included in the image processing apparatus 100 or in an apparatus external to the image processing apparatus 100. In a case where the image capturing device is an external device, the candidate image obtaining unit 205 obtains the candidate images via the data communication device 108. The still images and extracted images may be obtained from an external network or server via the data communication device 108. Examples of images obtained from a network or server include social networking service (SNS) images. Note that the candidate images obtained by the candidate image obtaining unit 205 are not limited to the above and may be images of other types.

A candidate image analyzing unit 206 analyzes image data on each of the candidate images obtained by the candidate image obtaining unit 205. In the present embodiment, the candidate image analyzing unit 206 derives a feature value of each candidate image, determines an object in the candidate image, determines the composition of the image, detects a face, recognizes an expression on the face detected, and executes personal recognition of the face detected. Further, the candidate image analyzing unit 206 refers to data accompanying the image data on each candidate image obtained from the HDD 104 (e.g., Exif information) and thereby obtains information on the shooting date and time. Also, the candidate image analyzing unit 206 assigns a score to each candidate image, the score being indicative of whether the image is suitable for the album. A high image score is given to a highly aesthetic candidate image with, for example, high contrasts or sharp edges. Also, a high image score is given to a candidate image with good content, in which, for example, no one is blinking, or a main subject such as a person or a building is in a large size.

A candidate template obtaining unit 207 obtains, from templates stored in the HDD 104, candidate templates set by the album creating condition setting unit 202 and analysis information on images placed on the candidate templates (such images are referred to as preset images). Details of how the album creating condition setting unit 202 sets the candidate templates will be given later with reference to FIG. 5. A candidate template may be one in the model album data set by the album creating condition setting unit 202, one in other model album data, or one in other album data created using the app. The app may hold a general-purpose template, and the general-purpose template may be used as a candidate template. A candidate template may be one generated dynamically based on a template in the model album data. For example, a given slot is deleted from a model template, and an adjacent slot is expanded to fill the emptied space. A template thus obtained by modification of a model template may be used as a candidate template.

From the group of candidate images, a similar image selecting unit 208 selects similar images to use for the similar album based on the analysis information on the model images obtained by the model image analyzing unit 204 and the analysis information on the candidate images obtained by the candidate image analyzing unit 206. For each model image, the similar image selecting unit 208 selects a similar image from the candidate images. A similar image is an image with a high similarity to a model image among the group of candidate images. The similarity is, for example, the distance between the image feature value derived by the model image analyzing unit 204 and the image feature value derived by the candidate image analyzing unit 206. The shorter the distance, the higher the similarity. For the similarity determination, the result of personal recognition performed by the candidate image analyzing unit 206 in selecting similar images may be used, or whether the image score is high or low may be added to the criteria for the selection. For each candidate template obtained by the candidate template obtaining unit 207, the similar image selecting unit 208 similarity selects, from candidate images, similar images similar to the preset images. In other words, the similar image selecting unit 208 selects similar images for the candidate template based on analysis information on the preset images placed on the candidate template and the analysis information on the candidate images. Hereinbelow, the similar images similar to model images may be referred to as first similar images, and similar images similar to preset images may be referred to as second similar images. Selecting a candidate template which is similar to a template used in the model album increases the possibility of the preset images in the candidate template being similar to the model images.

A template determining unit 209 determines a template to use for the album to create, based on the similar images selected by the similar image selecting unit 208 and the templates obtained by the model album data obtaining unit 203 and the candidate template obtaining unit 207.

Using the template determined by the template determining unit 209 and the similar images selected by the similar image selecting unit 208, a layout creating unit 210 allocates the similar images to the template determined by the template determining unit 209. Data in which the similar images are allocated to the template determined by the template determining unit 209 is called layout data. It should be noted that the template determined by the template determining unit 209 may be a model template or a candidate template.

An album data outputting unit 211 puts together the layouts of all the spreads created by the layout creating unit 210 and outputs them as album data. In the present embodiment, similar album data is outputted.

The album displaying unit 212 creates album images based on the album data outputted from the album data outputting unit 211, and displays the album images on the display 105. The album images are, for example, image data in bitmap format in which the images are arranged according to a predetermined layout.

After the program of the album creating application of the present embodiment is installed into the image processing apparatus 100, an activation icon for this app is displayed on the top screen (desktop screen) of the operating system (OS) operating on the image processing apparatus 100. Once a user double-clicks on the activation icon on the desktop screen displayed on the display 105 using the mouse 107, the program for the album creating application stored in the HDD 104 is loaded into the RAM 103. Then, the CPU 101 executes the program loaded into the RAM 103, thereby activating the album creating application. This is the software configuration of the image processing apparatus of the present embodiment. The application may be in a different form, which is, for example, a web app displaying a screen or the like in a browser running on the image processing apparatus 100.

<Gui Screen>

Figure 5:
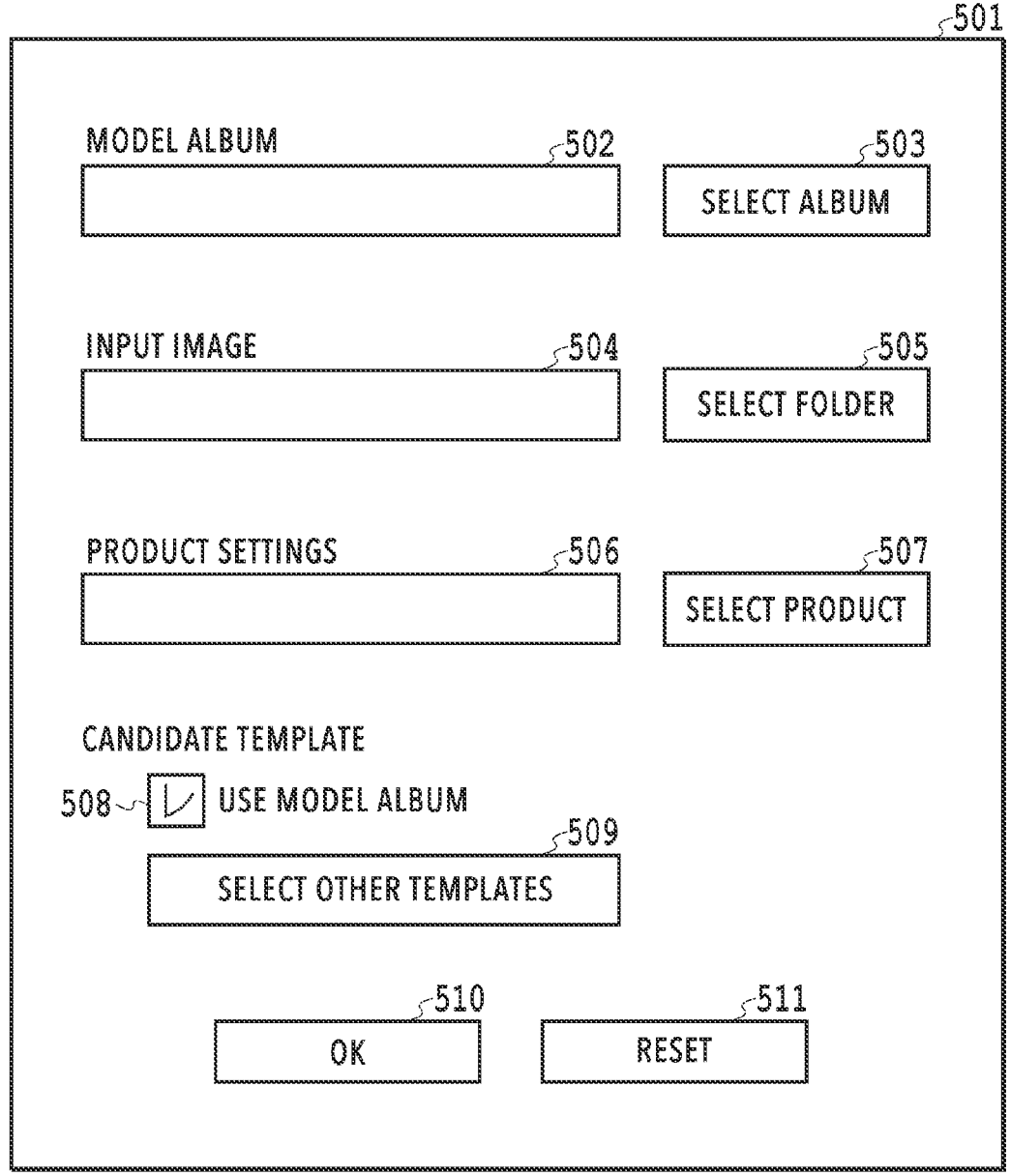
FIG. 5 is a diagram showing a GUI of an album creating application.

FIG. 5 is a diagram showing a GUI screen of the album creating application of the present embodiment. FIG. 5 shows a GUI screen 501 provided by the activated album creating application and displayed on the display 105. A user can set album creating conditions through the GUI screen 501.

As sections (items) for setting model album data, the GUI screen 501 has a path box 502 and a select button 503. The path box 502 is a box for showing the location (i.e., the path to) where model album data is stored in the HDD 104. The select button 503 is a button for selecting model album data. Once a user clicks on the select button 503 with the mouse 107, a tree formed by a plurality of folders and files is displayed. Then, once the user selects a file containing model album data, a file path to the selected file is displayed in the path box 502.

A path box 504 and a select button 505 are sections for setting picture images to be included in an album. In other words, in the present embodiment, the path box 504 or the select button 505 is used to select a group of candidate images. Displayed in the path box 504 is the location (a path to) where a group of candidate images from which to create a similar album are stored in the HDD 104. The select button 505 is a button for selecting a folder containing a group of candidate images to use to create a similar album. Once a user clicks on the select button 505 with the mouse 107, a tree formed by a plurality of folders is displayed. Then, once the user selects a folder containing a group of candidate images from which to create a similar album, a folder path to the selected folder is displayed in the path box 504.

A product setting box 506 and a product select button 507 are sections for setting a product for the similar album to create. The product setting box 506 is a box for showing product information on the album to create. After model album data is selected, product information on the model album data is displayed. The product select button 507 is a button for switching products. Once a user clicks on the product select button 507 with the mouse 107, a list of products is displayed. Then, once the user selects a product, the selected product information is displayed in the product setting box 506.

A check box 508 is a section for setting a flag indicative of whether to use templates on the other spreads in the model album data as candidate templates. By clicking on the check box 508 with the mouse 107, a user checks or unchecks the check box 508. In a case where the check box 508 is checked, model templates included in the model album data selected using the GUI in FIG. 5 are used as candidate templates.

A select button 509 is a button for selecting a file path to the template to be obtained as a candidate template. Once the user clicks on the select button 509 with the mouse 107, a tree formed by a plurality of folders and trees is displayed. Then, once the user selects a file to a candidate template, the selected file is set as a candidate template.

An OK button 510 is a button for determining the selected conditions as album creating conditions. Once a user clicks on the OK button 510 with the mouse 107, the album creating conditions are confirmed and are communicated to the automatic layout processing unit 201 via the album creating condition setting unit 202. More specifically, information on the path inputted in the path box 502 is communicated to the model album data obtaining unit 203, information on the path inputted in the path box 504 is communicated to the candidate image obtaining unit 205, and the product information inputted in the product setting box 506 is communicated to the album data outputting unit 211. Candidate template information set in the check box 508 and the select button 509 is communicated to the candidate template obtaining unit 207.

A reset button 511 is a button for resetting what is set on the displayed screen. This is the GUI screen of the album creating application of the present embodiment.

<Automatic Layout Processing>

Figure 6A:
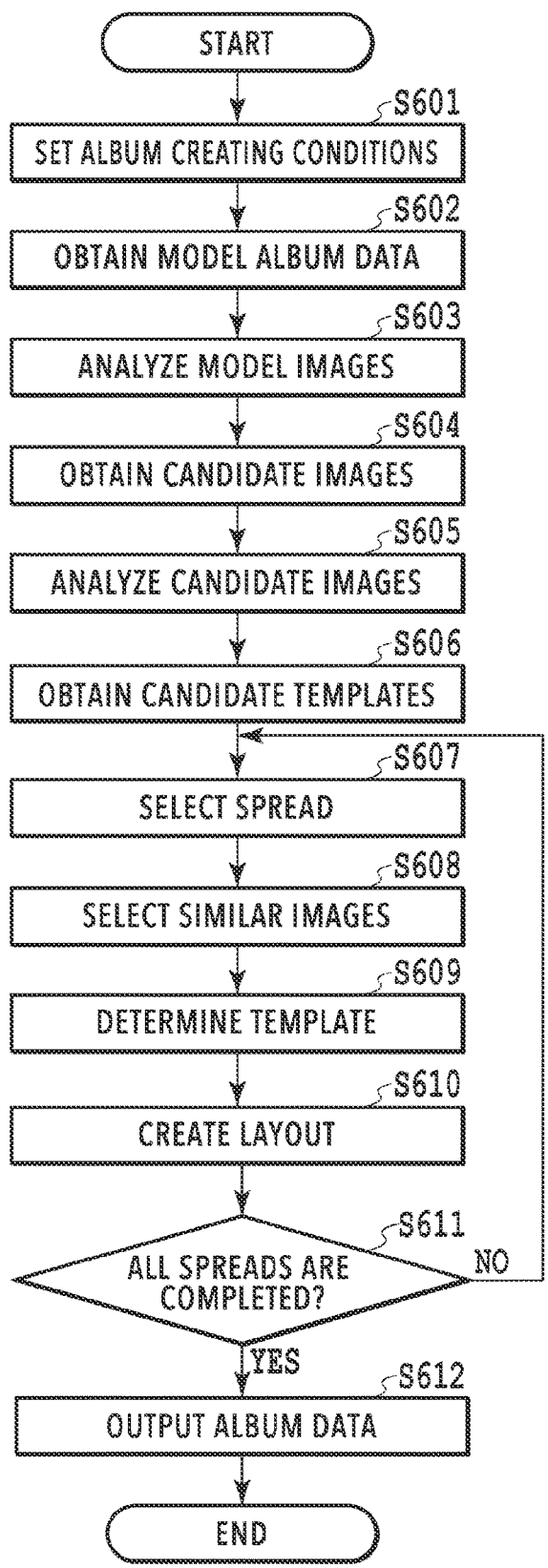
FIGS. 6A to 6C are flowcharts of automatic layout processing.
Figure 6B:
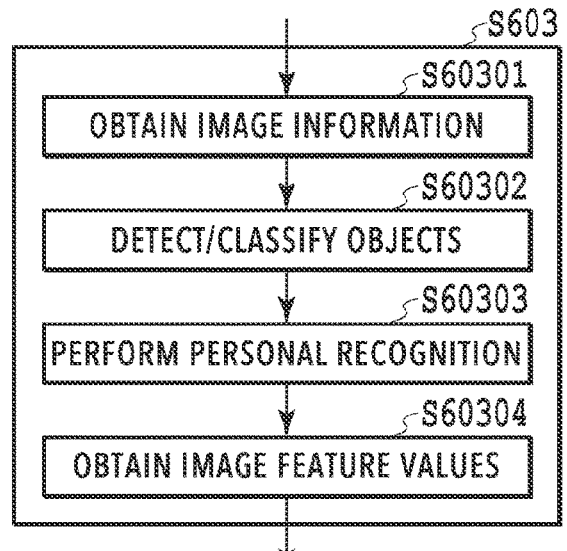
Figure 6C:
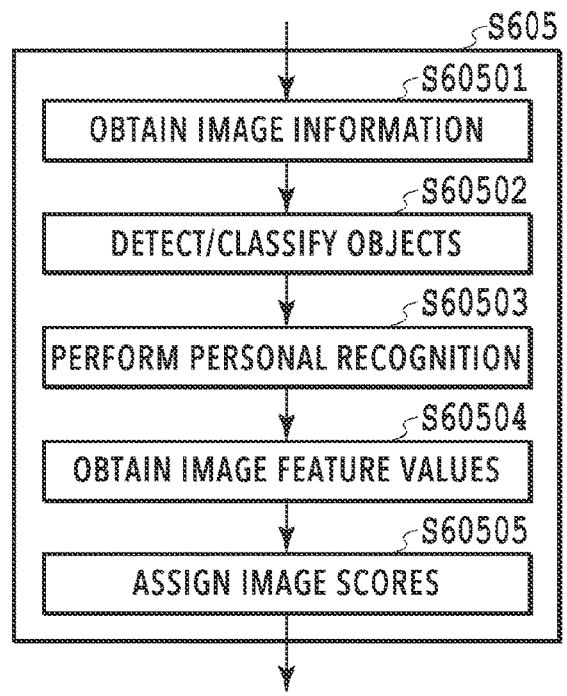

Automatic layout processing of the present embodiment is described below using FIGS. 6A to 6C. FIG. 6A is a flowchart of automatic layout processing of the album creating application according to the present embodiment. The flowcharts shown in FIGS. 6A to 6C are implemented by, for example, the CPU 101 loading the program stored in the HDD 104 into the ROM 102 or the RAM 103 and executing the program.

In Step 601, the album creating condition setting unit 202 sets album creating conditions. Hereinbelow, "Step" is abbreviated to S. In the present embodiment, model album data and a group of candidate images to be used for the album are set in S601 as album creating conditions.

In S602, the model album data obtaining unit 203 reads the model album data set in S601, and loads the model album data into the RAM 103. The model album data obtaining unit 203 also reads model image data from the HDD 104 using the image file path recorded in the model album data, and loads the image data into the RAM 103.

In S603, the model image analyzing unit 204 analyzes the model image data loaded into the RAM 103 in S602. The image analysis performed in this step is now described using FIG. 6B.

In S60301, the model image analyzing unit 204 obtains information on the shooting date and time of each set of the model image data obtained by the model album data obtaining unit 203. In the present embodiment, the information on the shooting date and time is obtained based on Exif information accompanying each set of model image data.

In S60302, the model image analyzing unit 204 detects objects in each set of the model image data, and classifies the detected objects. In the present embodiment, faces are detected as objects. Any publicly known method may be employed for the face detection, and an example of such publicly known method is AdaBoost, which forms a strong classifier with multiple weak classifiers. In the present embodiment, a strong classifier formed by AdaBoost is used to detect the face of a person. The model image analyzing unit 204 detects a face in an image and obtains the coordinate values of the upper left point and the lower right point of the region of the detected face on the image. By finding these two coordinate values, the model image analyzing unit 204 can identify the position and the size of the face. By using AdaBoost that detects animals such as dogs or cats and AdaBoost that detects dishes in the same way as the face of a person, the model image analyzing unit 204 can not only detect an object in an image, such as a person, an animal, and a dish, but also classify the object in the image to determine what the object is. Objects to be detected are not limited to the ones above, and may be a flower, a building, a figurine, or the like. Although AdaBoost is used to classify an object herein, image recognition may be performed using a deep neural network.

In S60303, the model image analyzing unit 204 performs personal recognition on the face detected in S60302. First, the model image analyzing unit 204 derives the similarities between a face image extracted and representative face images stored for the respective personal IDs in a face dictionary database. Then, a personal ID whose similarity thus derived to the extracted face image is equal to or higher than a predetermined value and is the highest of all the personal IDs is determined as an ID corresponding to the extracted face image. In other words, the person with a personal ID whose similarity to the extracted face image is equal to or higher than a predetermined value and is the highest of all the personal IDs is identified as a person to which the face in the extracted face image belongs. In a case where the similarities derived for the personal IDs are all below the predetermined threshold, the person of the face image extracted is regarded as a new person, is given a new personal ID, and is registered in the face dictionary database. The face dictionary database is stored in, for example, the HDD 104.

In S60304, the model image analyzing unit 204 derives an image feature value of each set of the model image data. Examples of the image feature value include color information. A histogram may be used as a method for using color information as an image feature value. Image data typically consists of pixels in each of which three RGB values are recorded. The model image analyzing unit 204 forms a histogram for each of the R values, B values, and G values of the entire image. A histogram can be formed by counting the frequency of appearance of a certain value within each range. For instance, in a case where pixel values are recorded from 0 to 255 and are counted in 16 ranges (0 to 15, 16 to 31, . . . , and 240 to 255), 48-dimensional feature values can be obtained (three values×16 ranges=48 dimensions). Note that the image feature value is not limited to this. For example, a deep neural network may be used to derive the feature value. Specifically, inputting model image data into a deep neural network that performs object recognition yields an interim value in the process of computation in addition to the recognition results which are the type of the object and a numerical value indicating the probability thereof. Since the features of an image for recognizing of an object are concentrated in this interim value, the interim value can be used as a feature value representing model image data. Alternatively, the object detected in S60302 or the result of personal recognition performed in S60303 may be used as a feature value. For example, the number of people in an image may be used as a feature value, or how frequent a person in an image appears in the entire group of images may be used as a feature value based on the result of personal recognition.

Although the model image analyzing unit 204 analyzes model image data in the present embodiment, the present disclosure is not limited to this. For example, the analysis results obtained by the model image analyzing unit 204 may be stored in the HDD 104 as analysis information in advance. Then, the model image analyzing unit 204 may check whether analysis information on model image data is stored in the HDD 104, and read the analysis information in a case where the analysis information is stored.

Referring back to FIG. 6A, in S604, the candidate image obtaining unit 205 reads the group of candidate images set in S601 from the HDD 104, and loads them into the RAM 103.

In S605, the candidate image analyzing unit 206 analyzes candidate image data included in the candidate images loaded into the RAM 103 in S604. The image analysis in this step is described using FIG. 6C. S60501 to S60504 are basically the same analysis processing as S60301 to S60304 and are therefore not described in detail here. The difference between them is whether target image data is model image data or candidate image data.

In S60501, the candidate image analyzing unit 206 obtains information on the shooting date and time of each set of the candidate image data on the group of candidate images obtained by the candidate image obtaining unit 205. In S60502, the candidate image analyzing unit 206 detects objects in each set of the candidate image data on the group of candidate images obtained by the candidate image obtaining unit 205, and classifies the detected objects. In S60503, the candidate image analyzing unit 206 performs personal recognition on the faces detected in S60502. In S60504, the candidate image analyzing unit 206 derives image feature values of the candidate image data on the group of candidate images.

In S60505, the candidate image analyzing unit 206 assigns image scores to the respective sets of candidate image data on the group of candidate images. An image score is, for example, a focus level. The focus level may be determined using edge detection, for which a publicly known Sobel filter can be used. An edge in an image is detected with a Sobel filter, and the difference in luminance between the start and end points of the edge is divided by the distance between the start point and the end point. Thereby, a luminance gradient, i.e., the slope of the edge is calculated. The average of the slopes of edges in the image is calculated, and an image with a large average slope can be regarded as being in focus more than an image with a smaller average slope. In the present embodiment, a plurality of thresholds are set for measuring the magnitude of the calculated average of the slopes of edges, and it is determined which of the thresholds the calculated average of the slopes of edges equals or exceeds. Thereby, it is determined whether the focus level is acceptable. Specifically, two different slope thresholds are set: a first threshold and a second threshold (where the first slope threshold>the second slope threshold). Then, the focus level is judged with good, fair, or poor. In a case where the average of the slopes of edges in an image equals or exceeds the first threshold, the focus level is determined as favorable (good). In a case where the average of the slopes of edges in an image is below the first threshold and equal to or above the second threshold, the focus level is determined as acceptable (fair), and in a case where the average of the slopes of edges in an image is below the second threshold, the focus level is determined as unacceptable (poor). This way, an image which is in focus can be given a high score. Although the focus level is used as a score indicative of image quality in the present embodiment, the present disclosure is not limited to this. For example, the image size, shooting information such as information on the lens used for the shooting, and a compression format for images inputted to the application may be used as a score indicative of image quality.

Besides the image quality, a score may be assigned depending on the content of the image. For example, the face size derived in S60502 and the results of personal recognition performed in S60503 can be used. First, based on the results of personal recognition on each set of candidate image data, the candidate image analyzing unit 206 sets a person appearing most frequently as a main subject. Candidate image data with no main subject therein is given a score zero as a score given for the main subject in the candidate image data. For candidate image data with the main subject therein, the proportion of the face of the individual set as the main subject relative to the image size is given as a score of the main subject in that candidate image data. Although the face size is used for the score assignment based on the main subject in the present embodiment, the score assignment may be based on other than the face size. For example, an expression on a person which is the main subject is determined, and an additional point may be given in a case where the expression is a smile. In a case where the main subject is not a person, the score assignment may be performed similarly according to the object size by using the results of object detection and classification in S60503. As described, the candidate image analyzing unit 206 assigns a score to each set of candidate image data on the group of candidate images based on the focus level of the candidate image data analyzed or whether the candidate image data analyzed includes the main subject.

Referring back to FIG. 6A, in S606, the candidate template obtaining unit 207 obtains candidate templates set by the album creating condition setting unit 202. In this example, the templates in the model album data and a template set with the select button 509 are obtained as candidate templates. In a case of using a template in the model album data as a candidate template, the template is called a candidate model template. Although the candidate template obtaining unit 207 also obtains, from the HDD 104, analysis information on the preset images placed on the template, the present disclosure is not limited to this. In a case where analysis information on the preset images is not stored in the HDD 104, the model image analyzing unit 204 may analyze the preset images placed on the candidate template. Although candidate templates to obtain are set by the album creating condition setting unit 202 in advance in the present embodiment, the candidate templates may beset during the automatic layout processing. For example, every time a layout is to be automatically determined for a spread, candidate templates to use for that spread may be set by a user.

In S607, the layout creating unit 210 selects the spread number of a spread being a processing target for which to create a layout. In the present embodiment, spreads are selected sequentially from spread number "0."

In S608, the similar image selecting unit 208 selects candidate images to be placed on the spread number selected in S607 as similar images based on the analysis information on the model images obtained by the model image analyzing unit 204 and the analysis information on the candidate images obtained by the candidate image analyzing unit 206. In the present embodiment, from the analysis information on the model images obtained by the model image analyzing unit 204, the similar image selecting unit 208 first obtains the model image feature values of the model images placed on the spread number selected in S607. In a case where the model template corresponding to the target spread number includes more than one slot, the model images are included as many as the slots, and therefore, the image feature value is obtained for each of those model images.

Based on the image features thus obtained, the similar image selecting unit 208 calculates, for each of the model images, the similarities between the image feature value of the model image and the image feature values of the candidate images. A similarity can be calculated using, for example, the Euclidean distance between two feature values. The similar image selecting unit 208 selects candidate image data with the highest similarity as similar image data. To avoid the same candidate image data being selected more than once, candidate image data selected once is excluded from the similarity calculation performed after that. Although a similar image is selected using image feature values in the present embodiment, the present disclosure is not limited to this. For example, the image scores obtained by the candidate image analyzing unit 206 may be used. Specifically, top five sets of candidate image data with feature values similar to that of the model image data are selected, and the candidate image data with the highest image score may be selected as a similar image. In another example, the personal recognition results obtained by the model image analyzing unit 204 and the candidate image analyzing unit 206 may be used. For example, in a case where model image data has a main subject therein, candidate image data having no main subject therein is not selected as similar image data even in a case where the image feature similarity is high. As a result of the above processing, the similarities between the model images laid out on the n-th page (where n is a natural number) of the model album data and the similar images laid out on the n-th page of the similar album data are obtained.

The similar image selecting unit 208 similarly selects similar images for the preset images placed on the candidate templates obtained in S606. However, in a case of using a template in the model album data as a candidate template, templates for spreads after the spread number selected in S607 are not used. For example, in a case where the target spread is the spread number "1," to use a model template on another spread in the model album data as a candidate template in S608, model templates on and after the spread number "2" are not used as a candidate template. This is for the purpose of creating an album with a finish quality similar to that of the model album data. Suppose a case where a model template on the spread number "2" is used as a candidate template for the target spread number "1," and is then adopted as a candidate template for the spread number "1." In that case, similar images similar to and therefore optimum for the model template on the spread number "2" are used for the spread number "1." Then, in the event where the target spread is the spread number "2," the candidate images already used as the similar images for the spread number "1" are, as described earlier, excluded so as to avoid selecting the same image more than once. Consequently, the similar images originally optimal for the model template on the spread number "2" cannot be used for the spread number "2." In other words, similar images which should be used for the spread number "2" of the album data to achieve favorable finished quality cannot be used for the spread number "2." Thus, in a case where a template in model album data is used as a candidate template, templates after the spread number selected in S607 are not used so that similar images that may be used for the unprocessed spreads may not be used for the preceding spreads. Considering the above, for the first spread, a model template from the model album data is not selected as a candidate template. Thus, for example, a model template in other album data may be used as a candidate template. Alternatively, the template selected with the select button 509 may be used as a candidate template.

Except for the above case of not using templates after the spread number selected in S607 in a case of using a template in the model album data as a candidate template, similar images for a candidate template can be obtained using a large amount of candidate images. As described earlier, S608 is executed for each spread to be processed. Thus, for the same target spread, a candidate image selected as a similar image for a different candidate template is not excluded from the similarity calculation for the same target spread number, and the same candidate image can be selected as a similar image. In other words, for a first candidate template and a second candidate template, a similar image selected as being similar to a preset image in the first candidate template and a similar image selected as being similar to a preset image in the second candidate template may be the same image. For the same spread number, only one template is ultimately selected. Thus, there is no problem even in a case where the same similar image is selected for the other unselected candidate template as well. It goes without saying that in a case where the first candidate template is selected as a template to use, the similar images similar to the preset images in the first candidate template are excluded from the similarity calculation for the following spreads, as described earlier.

In S609, the template determining unit 209 determines a template to use for the similar album based on the similar images selected by the similar image selecting unit 208 and the templates obtained by the model album data obtaining unit 203 and the candidate template obtaining unit 207. In the present embodiment, the template determining unit 209 first determines whether the similar images selected for the model template are suitable. The model template here is one of the group of model templates obtained by the model album data obtaining unit 203 which corresponds to the spread number selected in S607. The determination of whether the similar images selected for the model template are suitable may be performed as follows. In a case where the similarity calculated between a similar image and the corresponding model image equals or exceeds a threshold for all the similar images selected (i.e., all the slots), the template determining unit 209 determines that the similar images selected for the model template are suitable, or in other words, determines to adopt the model template as a template for the album to create since suitable similar images are selected for the model template. Then, the processing proceeds to S610. The threshold can be, for example, a value preset based on subjective evaluation and incorporated into the app. The threshold can also be adjusted by a user using the GUI on the app.

In another example, the threshold may be determined based on a deviation from average similarity. For example, based on the similarities of all the similar images selected by the similar image selecting unit 208, the second quartile and the third quartile are calculated. Then, the threshold may be determined using Formula 1 below.

$$\text{The threshold} = \text{the second quartile} + (\text{the third quartile} - \text{the second quartile}) \times 1.5 \quad \text{(Formula 1)}$$

According to the distribution of the similarity, an image with a low similarity can be determined.

In a case where there is even one similar image with a similarity smaller than the threshold, the template determining unit 209 selects a template which is closest to the model template from the model templates and the group of candidate templates. Being close to the model template means that, for example, the similarity between a similar image selected for a given template and a model image is high. It should be noted that in a case where there is no suitable candidate template, the model template may be selected again.

Figure 7:
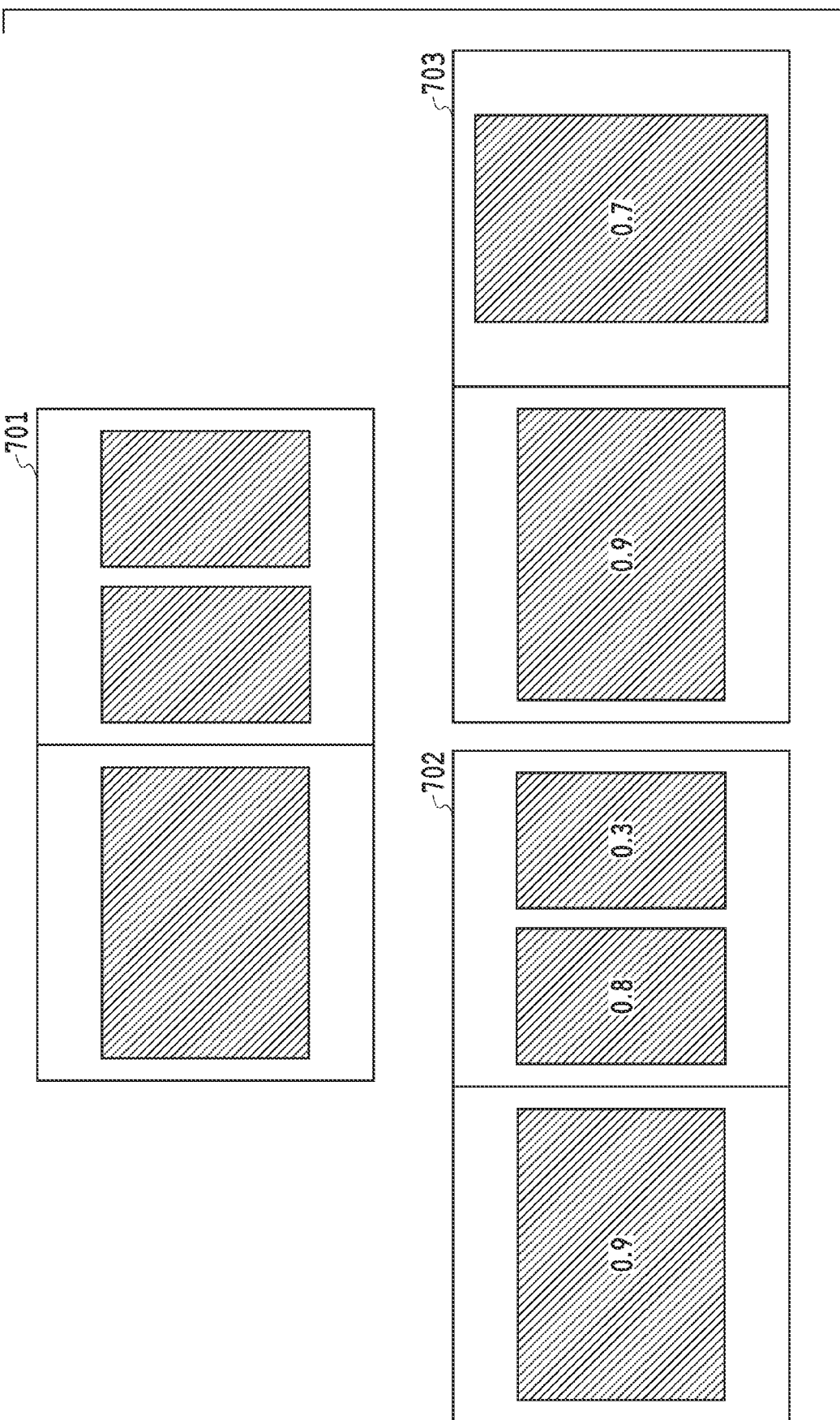
FIG. 7 is a diagram illustrating a method of template selecting processing.

FIG. 7 is a diagram illustrating an outline of template determining processing. A model template 701 is an example of a target model template. Layout data 702 is layout data generated by allocating similar images (first similar images) to the model template. Layout data 703 is layout data generated by allocating similar images (second similar images) to a candidate template. The hatched areas in FIG. 7 represent images. Although there is only one candidate template in this example for the sake of illustration, there may be more than one candidate template. The layout data 702 and 703 have similar images already allocated to the templates. The number in each similar image indicates the similarity of the similar image to the corresponding model image in the model template 701. The layout data 703, in which similar images (second similar images) are allocated to a candidate template, has two similar images placed therein. The model template 701, on the other hand, has three model images placed therein. For the layout data 703, the similarity of each similar image is found for each one of the three model images in the model template 701, and the highest similarity is shown in FIG. 7. Similarly, for the layout data 702, in which similar images (first similar images) are allocated to the model template, the similarity of each image to the corresponding model image in the model template 701 is found.

In the present embodiment, the template determining unit 209 adopts the layout data in which the lowest value of the thus-found similarities of the images therein is the largest among the sets of layout data. In the example in FIG. 7, the lowest value of the similarities of the images in the layout data 702 is "0.3," whereas the lowest value of the similarities of the images in the layout data 703 is "0.7." Hence, the layout data 703 is the layout data whose lowest value is the largest. Thus, in this example, the template determining unit 209 adopts the layout data 703. More specifically, since the layout data 702, in which similar images are placed according to the model template 701, includes an image whose similarity to the corresponding model image is low, the layout data 702 may not deliver the layout results intended by the user. In other words, in the present embodiment, the similarities to the model images are found not only for the layout data 702 in which similar images are placed on the model template 701, but also for the layout data 703 in which similar images are placed on a candidate template. Then, a suitable template is determined based on the similarities. This is because layout data (e.g., 703) including only images similar to the model images is more favorable in terms of finished album quality than layout data (e.g., 702) including an image dissimilar to a model image. In the example in FIG. 7, the model template 701 has three slots, whereas the template adopted has two slots. Even in a case where a model template and a template adopted have different numbers of slots like in the above example, layout data having only images with high similarities to the model images is more favorable in terms of finished album quality.

The template determining unit 209 determines the template used for the layout data thus adopted, as a template to use for the target spread. It is thus possible to determine a template in which images with features close to those in the model template can be placed. Although a template whose lowest similarity is the largest is selected in determining a template in the present embodiment, the present disclosure is not limited to this. For example, the average or maximum value of the similarities of the images placed on the template may be used. In a case of using the maximum value, the lowest value of similarity acceptable for the template can be set in advance.

In S610, the layout creating unit 210 creates layout data by allocating the similar images selected in S608 to the template determined in S609. A layout creating method of the present embodiment is described using FIG. 8.

Figure 8:
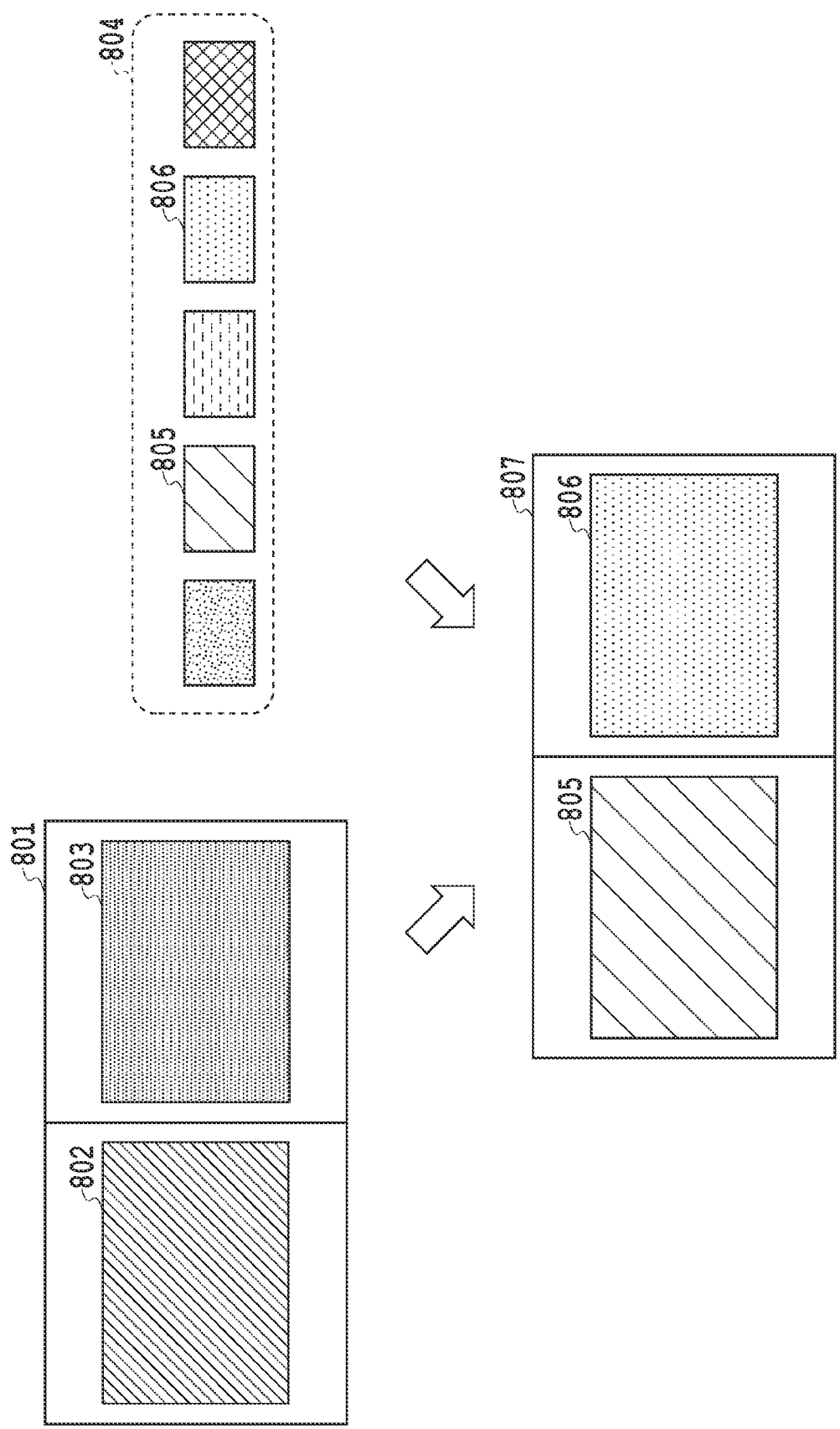
FIG. 8 is a diagram illustrating a layout creating method.

FIG. 8 is an example of the template determined in S609 to be used for the target spread and an example of layout data created by the layout creating unit 210. First, the layout creating unit 210 obtains a template 801 for the target spread. As described earlier, the template 801 may be a model template or may be a candidate template. In the template 801, images and information on their placement positions are recorded. Images 802 and 803 are images placed in the slots in the template 801 and indicate their placement positions in the template. A group of candidate images 804 is the group of images obtained by the candidate image obtaining unit 205. Similar images 805 and 806 are the similar images selected in S608. The similar image 805 is an image similar to the image 802, and the similar image 806 is an image similar to the image 803. The layout creating unit 210 creates layout data by placing the similar images 805 and 806 at the same positions as their corresponding images. Layout data 807 is the layout data created by the layout creating unit 210. In this way, layout data in which sets of similar image data similar to the model album data are placed can be created. Since the layout data is generated in S609 in the present embodiment, S610 may be skipped.

In S611, the layout creating unit 210 determines whether the processing from S607 to S610 has been completed for all the spreads of the model album data obtained by the model album data obtaining unit 203. If the determination result in this step is true, the processing proceeds to S612. If the determination result in this step is false, the processing proceeds back to S607.

In S612, the album data outputting unit 211 puts together the layout data created by the layout creating unit 210 for all the spreads and the product information set by the album creating condition setting unit 202 and outputs them as similar album data. The similar album data is in a format like the one shown in FIGS. 3A and 3B for example, and is stored in the HDD 104.

As described thus far, in a case where a group of candidate images do not include an image whose similarity to an image in the model template equals or exceeds a predetermined value, the present embodiment can select an alternative template to create a similar album. Since the template selected as the alternative template has images similar to the model images, it is more likely that the album can be created as desired by a user.

Second Embodiment

In the example described in the first embodiment, second similar images similar to the preset images included in a candidate template are laid out on the candidate template, and first similar images similar to the model images included in a model template are laid out on the model template. Then, in the example described above, a template to adopt is selected using resulting layouts on these templates. In an example described in the present embodiment, a candidate template is first selected from a group of candidate templates based on similar images (first similar images) similar to the model images placed on the model template, and then a favorable template is determined using the candidate template thus selected and the model template.

Figure 9:
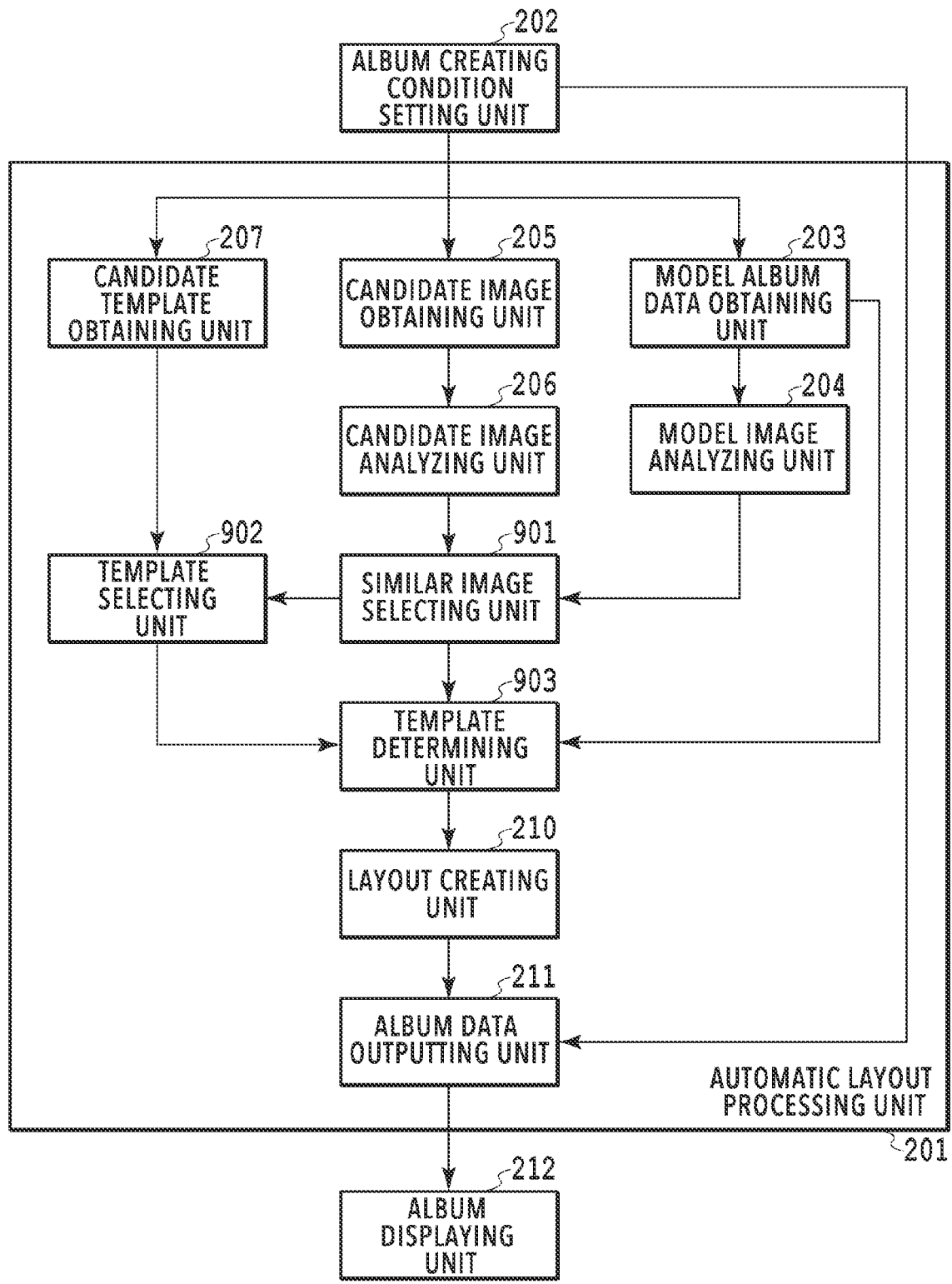
FIG. 9 is a block diagram showing the software configuration of an image processing apparatus.

FIG. 9 is a block diagram for album generation of the present embodiment. The reference numerals which are the same as those in the other embodiment denote the same processing in the same apparatus; thus, descriptions of such processing are omitted here. The present embodiment differs from the first embodiment in a similar image selecting unit 901 and a template determining unit 903. Also, a template selecting unit 902 is added.

The similar image selecting unit 901 selects images to use for the album based on the analysis information on the model images obtained by the model image analyzing unit 204 and the analysis information on the candidate images obtained by the candidate image analyzing unit 206. For each model image, the similar image selecting unit 901 selects a similar image similar to the target model image from candidate images. Unlike the first embodiment, the similar image selecting unit 901 of the present embodiment does not select similar images (second similar images) similar to the preset images included in the candidate templates.

Based on the similar images selected by the similar image selecting unit 901, the template selecting unit 902 selects one of the candidate templates obtained by the candidate template obtaining unit 207 which is suitable for the similar images (i.e., the similar images similar to the model images).

The template determining unit 903 determines which of the templates to adopt: the candidate template selected by the template selecting unit 902 or the model template. As described in the first embodiment, in a case where all the similarities between the model images in the model template and the similar images selected by the similar image selecting unit 901 as corresponding to the model images equal or exceed the predetermined threshold, the comparing processing described below is not performed, and the model template may be adopted.

Figure 10:
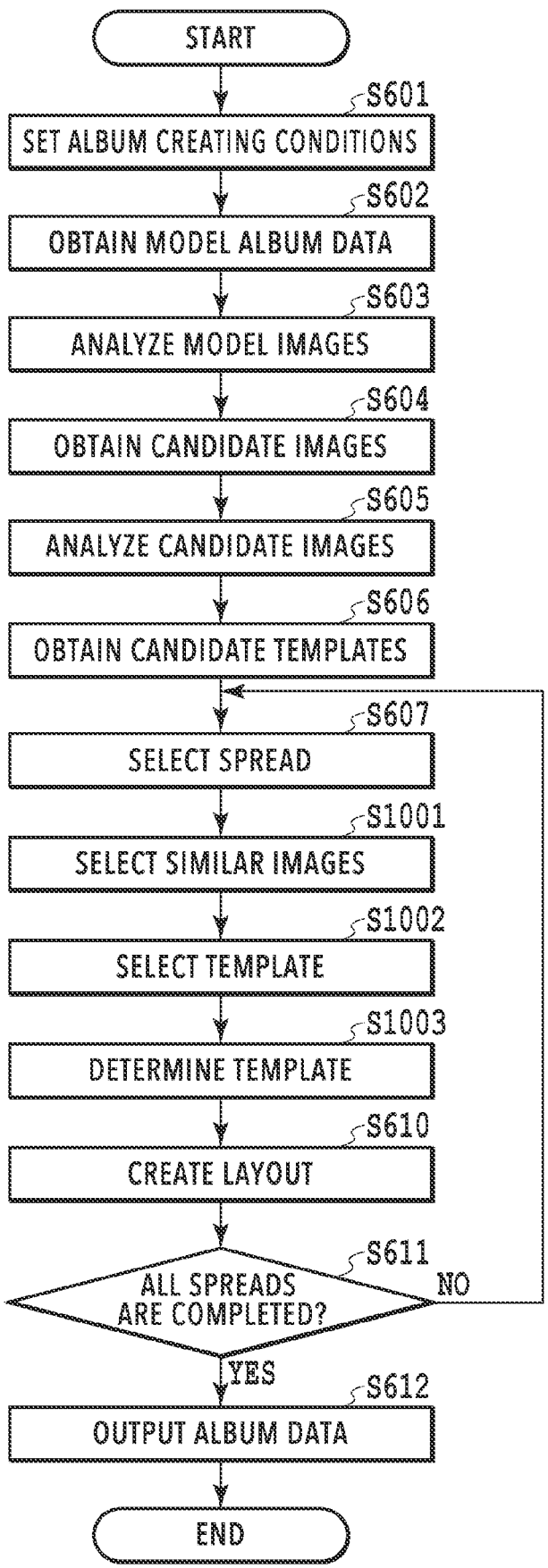
FIG. 10 is a flowchart of automatic layout processing.

FIG. 10 is a flowchart of automatic layout processing performed in the present embodiment. The same processing as that described in FIG. 6A of the present embodiment is denoted by the same reference numeral and is not described here. In FIG. 10, the processing in S1001 is performed after the processing in S607 of selecting a target spread.

In S1001, the similar image selecting unit 901 selects candidate images (i.e., similar images) to be placed on the spread number selected in S607 based on the analysis information on the model images obtained by the model image analyzing unit 204 and the analysis information on the candidate images obtained by the candidate image analyzing unit 206. In the present embodiment, first, the similar image selecting unit 901 obtains the image feature values of the model images placed on the spread number selected in S607 from the analysis information on the model images obtained by the model image analyzing unit 204. Then, the similar image selecting unit 901 calculates the similarities between the thus-obtained image feature value of each model image and the image feature values of the candidate images, and selects a candidate image with the highest similarity as a similar image. However, in a case where the highest similarity does not exceed a threshold, the candidate image is not selected as a similar image. This allows an image which is not really similar to the model image not to be selected. The threshold may be calculated using, for example, Formula 1, or may be a preset value.

In S1002, based on the similar images selected in S1001, the template selecting unit 902 selects a candidate template from the group of candidate templates obtained by the candidate template obtaining unit 207. In the present embodiment, a template that has preset images similar to the similar images selected in S1001 is selected as a candidate template.

FIG. 11 is a diagram showing an example of how a candidate template is selected in S1002. First, for each of the candidate templates, the template selecting unit 902 calculates the similarities between each of the similar images (similar to the model images) selected in S1001 and the preset images placed on the candidate template. Similar images 1101 are similar images selected in S1001. A candidate template 1102, a candidate template 1103, and a candidate template 1108 each has image slots. In the image slots of each candidate template, preset images of the candidate template are placed. The number in each of the image slots in each candidate template indicates the similarity of the preset image to the similar image 1101. For example, the similarity of the preset image in an image slot 1104 in the candidate template 1102 to the similar image A is "0.9," and the similarity of the preset image in the image slot 1104 to the similar image B is "0.5."

The template selecting unit 902 allocates the similar images 1101 to the image slots of each of the candidate templates. As for the allocation method, the similar images 1101 are allocated based on the similarities between the similar images 1101 and the preset images in the candidate template. More specifically, to the image slots in a candidate template, the similar images are allocated sequentially from an image slot with the highest similarity to the similar images 1101. For example, for the candidate template 1102, the similar image A is allocated to the image slot 1104, and then the similar image B is allocated to an image slot 1105. For the candidate template 1103, the similar image A is allocated to an image slot 1106, and then the similar image B is allocated to an image slot 1107. Note that for the candidate template 1108, the similar image A is allocated to an image slot 1109, and the similar image B is not allocated.

Thereafter, for each of the candidate templates, the average of the similarities between the allocated similar images and the preset images in the image slots is calculated and determined as the similarity of the candidate template (i.e., the similarity to the similar images similar to the model images). For instance, the similarity of the candidate template 1102 is (0.9+0.2)/2=0.55, the similarity of the candidate template 1103 is (0.8+0.1)/2=0.45, and the similarity of the candidate template 1108 is 0.9. The template selecting unit 902 selects, from all the candidate templates, a candidate template with the highest similarity as a candidate template to adopt. Thus, in the example in FIG. 11, the candidate template 1108 is selected. A candidate template suitable for the similar images selected in S1001 (i.e., similar images similar to the model images) is thereby selected. Although the present embodiment uses only similarities based on image features, the present disclosure is not limited to this. For example, the image slots to which similar images can be allocated may be restricted based on the degree of agreement in the aspect ratio. In FIG. 11, the processing to select a candidate template is performed using the candidate templates 1102 and 1103 having slots as many as the similar images as candidate images and the candidate template 1108 having one slot, which is fewer than the similar images. Preparing candidate templates with different numbers of slots can lower the possibility of dissimilar image data being placed in a case where, for example, a group of candidate images do not include an image similar to the similar image B. In a case where the candidate templates have the same average similarity as a result of the above-described calculation of average similarities, a candidate template with more slots is preferentially selected. Also, the similarities may be weighted based on the number of slots in the candidate templates. For example, the similarity of a candidate template may be corrected by being multiplied by 0.5 for each slot less than the number of the similar images selected in S1001. In FIG. 11, the candidate template 1102 and the candidate template 1103 have the same number of slots as the similar images; therefore, their similarities are unchanged at 0.55 and 0.45, respectively. The candidate template 1108, on the other hand, has one less slot compared to the number of similar images; therefore, the similarity becomes 0.9×0.5=0.45. The template selecting unit 902 selects the candidate template 1102 because it has the highest similarity after the correction. In this way, it can be controlled whether to prioritize the image similarity or to prioritize the number of images in selecting a template.

In S1003, the template determining unit 903 determines which of the templates to use for the layout: the candidate template selected in S1002 or the model template. In the present embodiment, processing similar to S1002 is performed. Specifically, the similar images are allocated to the respective slots in the example template, and the average of the similarities between the similarity images and the corresponding model images is determined as the similarity of the model template. Then, the similarity of the selected candidate template and the similarity of the model template are compared, and one with the higher similarity is selected. Processing performed after that is the same as the example described in the first embodiment. As described in the first embodiment, in a case where the similarities between the model images in the model template and the similar images selected by the similar image selecting unit 901 as corresponding to the model images equal or exceed the predetermined threshold, the comparing processing described above is not performed, and the model template may be adopted.

As described thus far, the present embodiment first selects a candidate template having image(s) (image slot(s)) which are similar to the similar images similar to the model template. Then, this candidate template is compared to the model template, and a more suitable template is adopted. According to such processing, even in a case where the candidate images include an image dissimilar to a model image in the model template, an album can be created using a template suitable for the image.

OTHER EMBODIMENTS

In the examples described in the embodiments above, in a case where a group of candidate images do not include a similar image similar to a model image, a different template is used so as to create an album having finished quality similar to that of the model album. Here, the image processing apparatus is configured to be able to set one of two modes for the selection of a candidate template: a first mode in which a candidate template having the same number of images (slots) as the model template is preferentially selected and a second mode in which a candidate template not having the same number of images as the model template is allowed to be selected. Then, the image processing apparatus may be configured to perform the processing according to the second embodiment in a case where the first mode is set and perform the processing according to the first embodiment in a case where the second mode is set. In a case where the first mode is set, the threshold determination processing described in connection with S1001, i.e., not selecting a similar image which does not exceed the threshold, is not performed. For example, a user selects the first mode in a case where the user wants to have the same number of images as the model album as much as possible, and selects the second mode in a case where the user can accept bold layout change including changing the number of images. In this way, use of such modes allow creation of an album that meets the user's needs.

Although the embodiments are used to generate an album in the above examples, the present disclosure is not limited to this. The embodiments described above may be used to obtain an output result for articles other than albums (such as, for example, catalogs and books).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The present disclosure allows a printed article to be easily generated as desired by a user.

This application claims the benefit of Japanese Patent Application No. 2020-045638, filed Mar. 16, 2020, which is hereby incorporated by reference wherein in its entirety.

What is claimed is:

1. An image processing method comprising:
  obtaining a plurality of model templates forming a model album, a group of candidate images to be used to create an album, and a candidate template usable as an alternative template to the model templates;
  for each model image included in each of the model templates, selecting a similar image being one of the group of candidate images which is more similar to the model image than the other candidate images;
  in a case where a similarity between the model image in the model template for a processing target and the similar image thus selected as an image similar to the model image is smaller than a predetermined threshold, determining which of the model template for the processing target and the candidate template is to be used as a template for processing of the processing target; and
  creating a layout by placing, on the template thus determined, an image similar to an image placed on the template thus determined.

2. The image processing method according to claim 1, comprising:
  selecting a second similar image for each preset image included in the candidate template, the second similar image being one of the group of candidate images which is more similar to the preset image than the other candidate images, and
  determining a template to use for processing of the processing target based on a similarity between the model image in the model template for the processing target and a first similar image selected as an image similar to the model image and a similarity between the model image and the second similar image.

3. The image processing method according to claim 2, wherein
  the model template for the processing target is a template on which a plurality of model images are placed,
  a similarity which is highest of similarities between the first similar image and each of the model images is allocated to the first similar image,
  a similarity which is highest of similarities between the second similar image and each of the model images is allocated to the second similar image, and
  the template corresponding to the similar images whose lowest value of the similarities allocated to the similar images is largest is determined as a template to use for processing of the processing target.

4. The image processing method according to claim 1, comprising:
  selecting a candidate template to use based on similarities between first similar images and preset images included in the candidate template, the first similar images being images selected as being similar to the model images in the model template for the processing target, and
  determining a template to use for processing of the processing target based on a similarity obtained for the candidate template thus selected and a similarity obtained for the model template for the processing target.

5. The image processing method according to claim 4, wherein
  the template for which the higher similarity is obtained is determined as a template to use for processing of the processing target.

6. The image processing method according to claim 5, wherein
  the similarity obtained for the selected candidate template is an average of the similarities between the preset images in the candidate template and the first similar images selected, and the similarity obtained for the model template is an average of the similarities between the model images in the model template and the first similar images selected.

7. The image processing method according to claim 1, wherein
the predetermined threshold is determined based on the similarities between the similar images selected and their corresponding model images.

8. The image processing method according to claim 1, wherein
the predetermined threshold is a preset value.

9. The image processing method according to claim 1, wherein
the candidate template is a template different from the model template.

10. The image processing method according to claim 1, wherein
the candidate template includes the model templates of the model album except for the model templates to be processed after the model template for the processing target.

11. The image processing method according to claim 1, wherein
the candidate template includes a template obtained by modification of the model templates of the model album.

12. The image processing method according to claim 1, further comprising
setting a first mode to determine a template with a same number of images as the model template and a second mode to allow a template with a different number of images from the model template to be determined.

13. An image processing apparatus comprising:
one or more memories storing instructions; and
one or more processors executing the instructions to function as:
an obtaining unit configured to obtain a plurality of model templates forming a model album, a group of candidate images to be used to create an album, and a candidate template usable as an alternative template to the model templates;
a selecting unit configured to select, for each model image included in each of the model templates, a similar image being one of the group of candidate images which is more similar to the model image than the other candidate images;
a determining unit configured to, in a case where a similarity between the model image in the model template for a processing target and the similar image selected by the selecting unit as an image similar to the model image is smaller than a predetermined threshold, determine which of the model template for the processing target and the candidate template is to be used as a template for processing of the processing target; and
a creating unit configured to create a layout by placing, on the template thus determined, an image similar to an image placed on the template thus determined.

14. The image processing apparatus according to claim 13, wherein
the selecting unit selects a second similar image for each preset image included in the candidate template, the second similar image being one of the group of candidate images which is more similar to the preset image than the other candidate images; and
the determining unit determines a template to use for processing of the processing target based on a similarity between the model image in the model template for the processing target and a first similar image selected by the selecting unit as an image similar to the model image and a similarity between the model image and the second similar image.

15. The image processing apparatus according to claim 14, wherein
the model template for the processing target is a template on which a plurality of model images are placed,
the determining unit allocates, to the first similar image, a similarity which is highest of similarities between the first similar image and each of the model images,
the determining unit allocates, to the second similar image, a similarity which is highest of similarities between the second similar image and each of the model images, and
the determining unit determines, as a template to use for processing of the processing target, the template corresponding to the similar images whose lowest value of the similarities allocated to the similar images is largest.

16. The image processing apparatus according to claim 13, wherein
the determining unit selects a candidate template to use based on similarities between first similar images and preset images included in the candidate template, the first similar images being images selected by the selecting unit as being similar to the model images in the model template for the processing target; and
the determining unit determines a template to use for processing of the processing target based on a similarity obtained for the candidate template thus selected and a similarity obtained for the model template for the processing target.

17. The image processing apparatus according to claim 16, wherein
the determining unit determines the template for which the higher similarity is obtained, as a template to use for processing of the processing target.

18. The image processing apparatus according to claim 17, wherein
the similarity obtained for the selected candidate template is an average of the similarities between the preset images in the candidate template and the first similar images selected by the selecting unit, and
the similarity obtained for the model template is an average of the similarities between the model images in the model template and the first similar images selected by the selecting unit.

19. The image processing apparatus according to claim 13, wherein
the predetermined threshold is determined based on the similarities between the similar images selected by the selecting unit and their corresponding model images.

20. A non-transitory computer readable storage medium storing a program which causes a computer to function as:
an obtaining unit configured to obtain a plurality of model templates forming a model album, a group of candidate images to be used to create an album, and a candidate template usable as an alternative template to the model templates;
a selecting unit configured to select, for each model image included in each of the model templates, a similar image being one of the group of candidate images which is more similar to the model image than the other candidate images;

a determining unit configured to, in a case where a similarity between the model image in the model template for a processing target and the similar image selected by the selecting unit as an image similar to the model image is smaller than a predetermined threshold, determine which of the model template for the processing target and the candidate template is to be used as a template for processing of the processing target; and a creating unit configured to create a layout by placing, on the template thus determined, an image similar to an image placed on the template thus determined.

* * * * *